(12) United States Patent  (10) Patent No.: US 8,126,592 B2
Saunders et al.  (45) Date of Patent: Feb. 28, 2012

(54) ACTUATOR SYSTEM

(75) Inventors: Aaron Saunders, Somerville, MA (US);
Marc Raibert, Brookline, MA (US)

(73) Assignee: Boston Dynamics, Inc., Waltham, MA (US)

( * ) Notice: Subject to any disclaimer, the term of this patent is extended or adjusted under 35 U.S.C. 154(b) by 685 days.

(21) Appl. No.: 12/287,751

(22) Filed: Oct. 14, 2008

(65) Prior Publication Data

US 2010/0090638 A1 Apr. 15, 2010

(51) Int. Cl.
*G06F 19/00* (2011.01)
(52) U.S. Cl. ............................................ 700/245; 901/9
(58) Field of Classification Search .................. 700/245; 91/534; 318/563, 568.12; 623/26, 27; 901/9, 901/21, 22, 28
See application file for complete search history.

(56) References Cited

U.S. PATENT DOCUMENTS

| | | | |
|---|---|---|---|
| 3,530,767 A | 9/1970 | Shook | |
| 3,584,536 A | 6/1971 | Hillberry | |
| 3,824,896 A | 7/1974 | Tull, III | |
| 4,023,650 A | 5/1977 | Pleier | |
| 4,250,805 A | 2/1981 | Nowak | |
| 4,258,609 A | 3/1981 | Conway | |
| 4,318,333 A | 3/1982 | Cemenska | |
| 4,341,105 A | 7/1982 | Gerrick, Jr. | |
| 4,496,033 A | 1/1985 | Hall et al. | |
| 5,249,502 A | 10/1993 | Radocaj | |
| 6,959,231 B2 * | 10/2005 | Maeda | 700/245 |
| 7,023,164 B2 * | 4/2006 | Iribe et al. | 318/563 |
| 7,819,183 B2 * | 10/2010 | Borgstadt | 166/77.51 |

* cited by examiner

*Primary Examiner* — Dalena Tran
(74) *Attorney, Agent, or Firm* — Iandiorio Teska & Coleman

(57) ABSTRACT

An actuator subsystem preferably for a robot or bionic linkage. A joint between two robotic or bionic members includes at least first and second actuators such as piston-cylinder assemblies connected between the members. A hydraulic circuit includes a sensor subsystem for sensing the magnitude of the load on the piston-cylinder assemblies and/or members. A fluid supply system includes an actuatable control valve operable to supply fluid to one or both piston-cylinder assemblies. A control circuit is responsive to the sensor and is configured to electronically control the fluid subsystem to supply fluid to the first piston-cylinder assembly when the sensor subsystem senses a load below a predetermined magnitude and to supply fluid to both piston-cylinder assemblies when the sensor subsystem senses a load above the predetermined magnitude.

22 Claims, 6 Drawing Sheets

ACTUATOR SYSTEM

FIELD OF THE INVENTION

This subject invention relates to robotics, bionics, and hydraulic system therefor.

BACKGROUND OF THE INVENTION

In robotics and bionics (including powered exoskeletons and prostheses), it is common to drive various articulating and jointed members using hydraulic piston-cylinder assemblies.

For example, the applicant's "BigDog" four-legged robot includes numerous hydraulic piston-cylinder assemblies associated with the legs of the robot. These assemblies and the associated hydraulic circuit enable the quadruped robot to walk, run, climb, traverse rough terrain, and carry heavy loads. A gasoline engine drives the hydraulic actuation system. The robot's legs articulate like an animal's legs and have compliant elements that absorb shock and recycle energy from one step to the next. The "BigDog" robot is the size of a large dog or a small mule, measuring 1 meter long, 0.7 meters tall, and weighing 75 kilograms. The robot has an on-board computer that controls locomotion, servos the legs, and handles a wide variety of sensors. The robot control system manages the dynamics of its behavior to keep it balanced, steer, navigate, and regulate energetics as conditions vary. Sensors for locomotioning include joint position, joint force, ground contact, ground load, a laser gyroscope, and a stereo-vision system. Other sensors focus on the internal state of the robotic system monitoring the hydraulic pressure, oil temperature, engine temperature, RPM, battery charge, and other subsystems. The robot can run at 4 mph, climb slopes up to 35 degrees, walk across rubble, and it is able to carry a 340 pound load.

The legs of this robot include, among other elements, two members, e.g., a "thigh" and a "shin" jointed at a "knee". The thigh, in turn, is pivotally connected to the robot body at a shoulder joint. In prototype versions of the robot, one hydraulic piston-cylinder assembly is interconnected between the thigh and the shin.

The ability to walk, run, climb, and traverse rubble in a stable fashion while carrying a load is largely the result of advanced valves, advanced sensors, and computational algorithms dictating robot behaviors. High actuator speeds in the hydraulic system for the piston-cylinder assemblies requires a high flow rate for the hydraulic fluid. Increasing the load carrying capacity require large piston areas for the piston-cylinder assemblies. The combined result is a high power requirement.

With mobile manipulation and legged locomotion, it is often the case that leg movement requires, in some instances, high speed and low force while in other instances low speed and high force are required. For example, when the thigh raises the shin during walking, the force experienced on the thigh and the shin is low but the foot must travel quickly to its next position. Conversely, when the thigh lowers the shin to engage the ground, a higher force is experienced by the thigh and the shin.

To meet both requirements, a high flow rate and a large piston area are required. This results in large energy consumption when there is high flow, even when the force is low. Thus, a larger power plant is required including a larger hydraulic pump, a larger engine to run the pump, more cooling, and the like. Increasing the size and capability of the power plant, however, means the payload capacity of the robot decreases. Similar problems exist with other robots, powered exoskeletons, and prosthetic arms and legs.

Known hydraulic systems for industrial forklifts and the like are not suitable for use with robotics or bionics where a controller is used to electronically actuate the various hydraulic system valves based on a desired behavior. Still, it is useful to note the following U.S. patents incorporated herein by this reference: U.S. Pat. Nos. 3,584,536; 4,023,650; 4,258,609; 4,318,333; 4,496,033; 5,249,502; 3,824,896; 3,530,767; 4,250,805; and 4,341,105.

BRIEF SUMMARY OF THE INVENTION

It is therefore an object of this invention to provide a new actuation system for a robotic or bionic linkage.

It is a further object of this invention to provide such a system which enables high power on demand while enabling low power operations when needed.

It is a further object of this invention to provide such a system which, in one example, does not require a larger hydraulic system power plant or consume high power when delivering low force at high flow.

It is a further object of this invention to provide such a system which facilitates robots capable of carrying heavier payloads.

The subject invention results from the realization, in part, that an actuator system in one example for a robotic or bionic linkage which enables high power on demand while enabling low power operations when desired includes a hydraulic circuit which switches in an additional piston-cylinder assembly as needed to increase the effective area of the actuator. The additional actuators enable a reduction in the average power required reducing heat production, allowing a longer operational time, less wear, the use of lighter components, and the like. These actuators allow a reduction in the flow required when high forces are not needed by reducing the area of the piston. For a given stroke, the flow and the average power are reduced.

This subject invention features, in one embodiment, an actuator system for a linkage. There is a joint between two members and at least first and second actuator assemblies connected between the members. A hydraulic circuit includes a sensor subsystem for sensing the magnitude of the load on the actuator assemblies and/or members. A fluid supply system includes an actuatable control valve operable to supply fluid to one or both piston-cylinder assemblies. A control circuit is responsive to the sensor and is configured to electronically control the fluid subsystem to supply fluid to the first actuator assembly when the sensor subsystem senses a load below a predetermined magnitude and to supply fluid to both actuator assemblies when the sensor subsystem senses a load above the predetermined magnitude. In one example, the actuator assemblies are piston-cylinder assemblies.

In one example, the fluid supply system includes a pump providing hydraulic fluid to the actuatable control valve, a conduit between the first piston-cylinder assembly and the control valve for proving fluid to the first piston-cylinder assembly to drive the piston in one direction, and a conduit between the control valve and the second piston-cylinder assembly with a supply side valve actuatable to selectively supply fluid to the second piston-cylinder assembly. The control circuit is typically configured to electronically control the control valve and the supply side valve opening both when the sensor subsystem senses a load above the predetermined magnitude and closing the supply side valve when the sensor subsystem senses a load below the predetermined magnitude.

The first piston-cylinder assembly may be bi-directionally operable and the fluid supply subsystem then includes a second conduit between the control valve and the first piston cylinder assembly for driving the piston in the opposite direction. The fluid supply subsystem may further include a return side valve actuatable to connect fluid from the second piston-cylinder assembly to return. Typically, the control circuit is configured to electronically open the return side valve when the supply side valve is closed and to close the return side valve when the supply side valve is open.

The first and second piston-cylinder assemblies may be separate components or the first and second piston-cylinder assemblies can be integrated. One integrated assembly includes a first piston of the first piston-cylinder assembly connected to a first piston of the second piston-cylinder assembly. The second piston-cylinder assembly typically includes a second piston connected to the first piston of the first piston-cylinder assembly and to the first piston of the second piston-cylinder assembly to balance the first piston of the second piston-cylinder assembly.

The subject invention also features a legged robot comprising a robot body, at least one or more legs including two or more actuatable jointed members, and select jointed members including at least first and second actuator assemblies connected therebetween. A sensor subsystem senses the magnitude of the load applied to a robot member. A fluid supply subsystem is operable to supply fluid to one or both actuator assemblies. A control circuit is responsive to the sensor subsystem and is configured to electronically control the fluid supply subsystem to supply fluid to the first actuator assembly when the sensor subsystem senses a load below a predetermined magnitude and to supply fluid to both actuator assemblies when the sensor subsystem senses a load above the predetermined magnitude.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
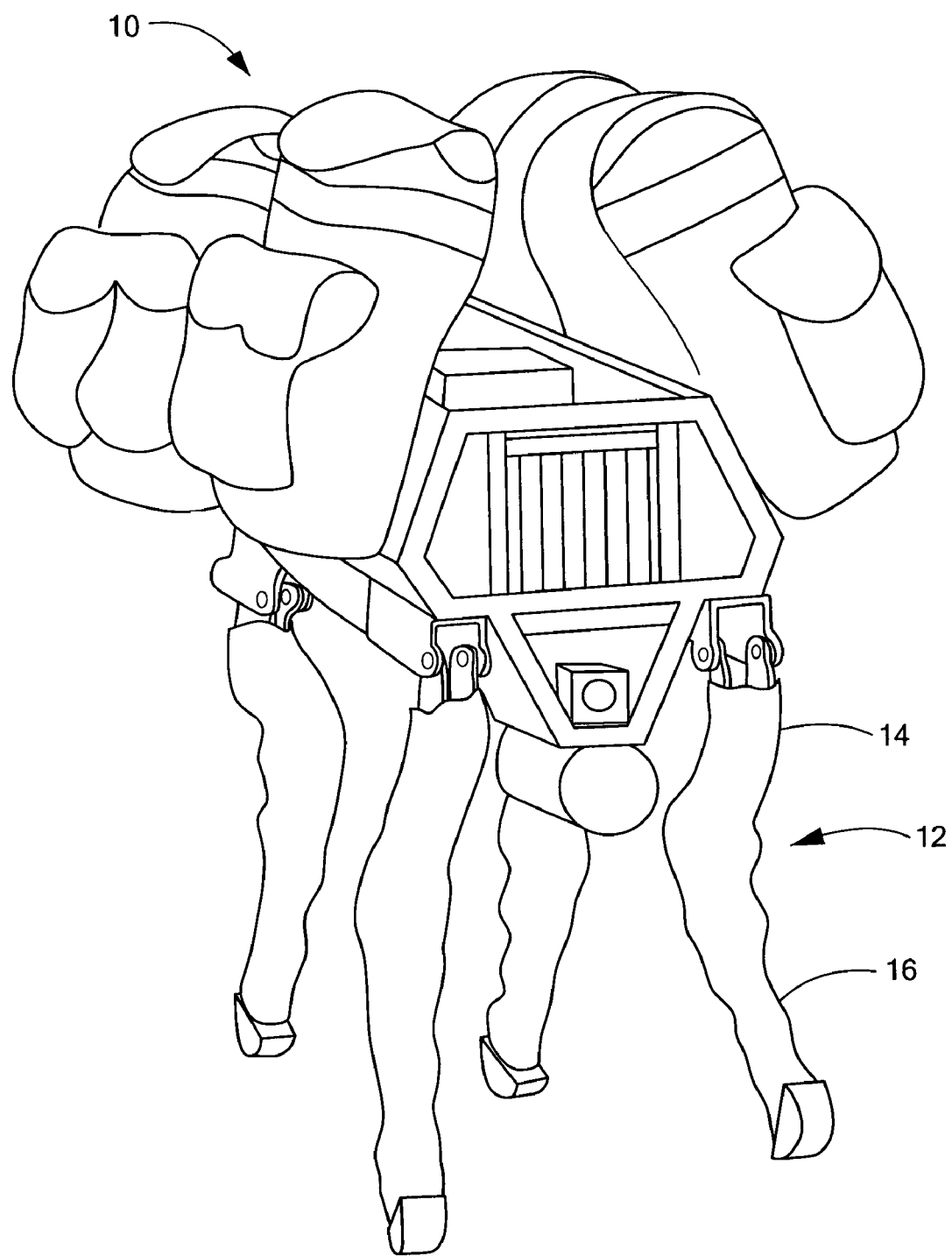
FIG. 1 is a highly schematic three-dimensional view showing an example of a legged robot in accordance with the subject invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 2:
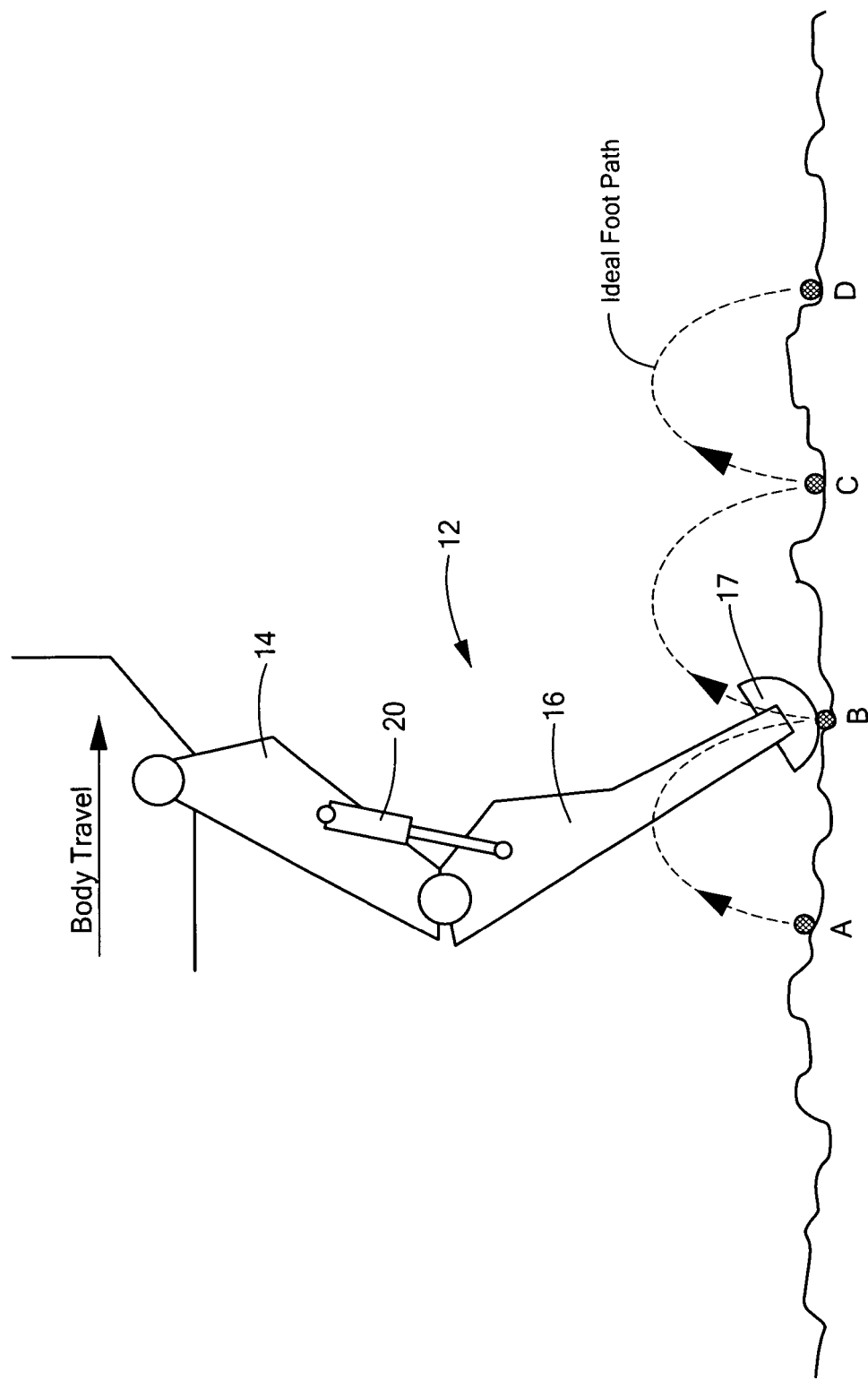
FIG. 2 is a highly schematic side-view showing an example of the primary components associated with a robot leg.

The subject invention can be employed with a variety of different robotic and bionic systems, but as one example, FIG. 1 shows a legged robot 10 called "BigDog" under development by the applicant hereof (Boston Dynamics, Inc., Waltham, Mass.). Foreleg 12 includes thigh member 14 and shin member 16. FIG. 2 shows, in a highly schematic fashion, piston-cylinder assembly 20 between thigh member 14 and shin member 16. It is understood that various mechanical linkages and the like associated with piston-cylinder assembly 20 are not shown.

As noted in the background section above, prototype versions of robot 10, FIG. 1, are able to walk, run, climb, walk across rubble, and carry a 340 pound load. But, it is desirable to increase the load carrying capacity of robot 10 meaning leg 12 will experience greater forces. Increasing the load carrying capacity, in turn, requires large piston areas for the piston-cylinder assemblies of the robot which in turn results in an increase in the size and capability of the hydraulic power plant. That result, however, undesirably lowers the payload capacity of the robot.

Figure 3:
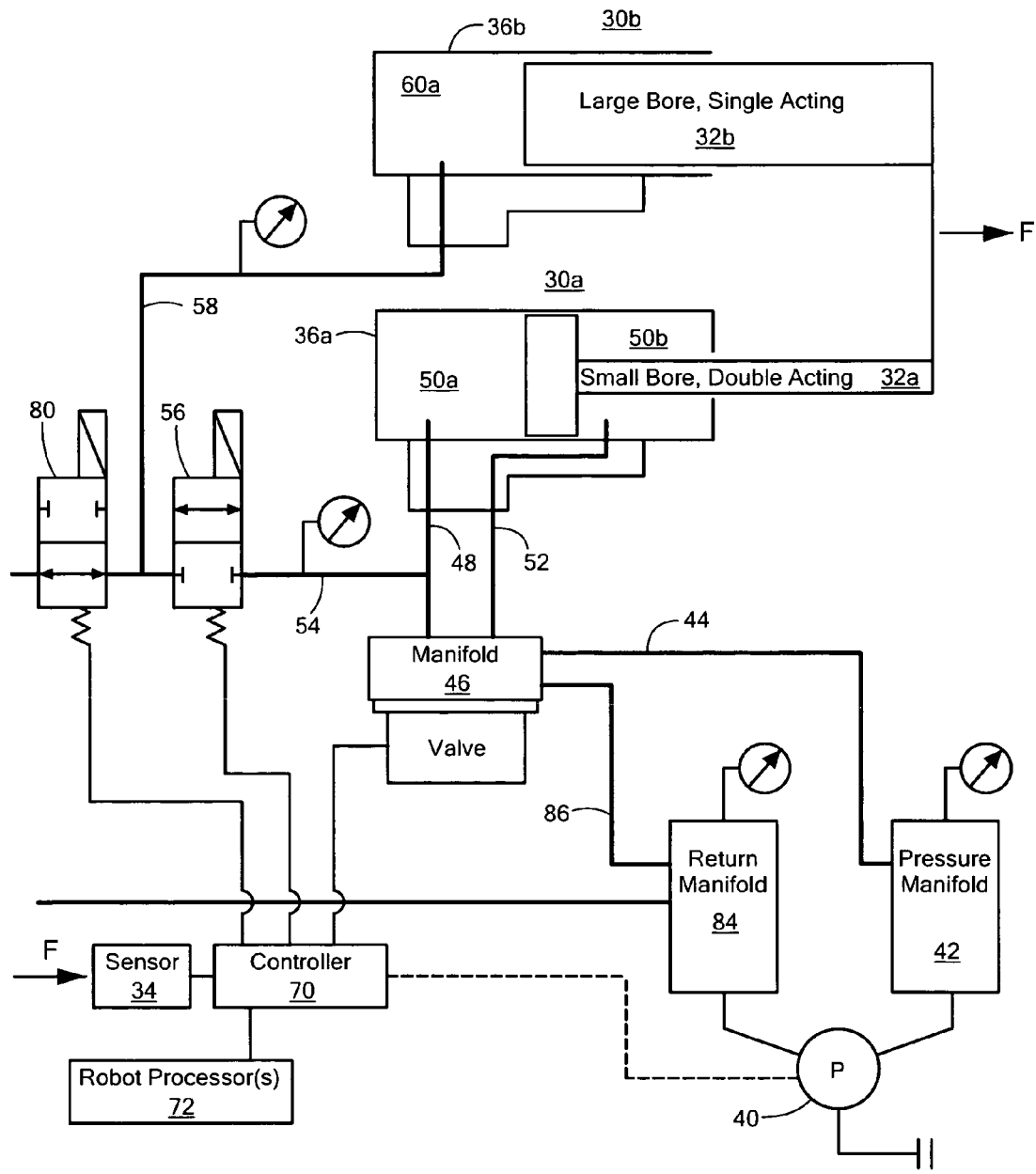
FIG. 3 is a block diagram showing the primary components associated with an example of a novel hydraulic circuit in accordance with the subject invention.

The subject invention features, in one example, at least first small bore piston-cylinder assembly 30a, FIG. 3 and second large bore piston-cylinder assembly 30b. In this example, both are interconnected between thigh member 14, FIG. 2 and shin member 16 on the same or on different sides of leg 12. FIG. 3 schematically shows the pistons 32a and 32b both interconnected and experiencing force F for illustration purposes. Other types of actuators, however, are possible.

Sensor subsystem 34 (e.g., load sensors which may be coupled to one or both cylinders 36a and 36b) measure the magnitude of the load experienced by the leg member and the piston-cylinder assemblies 30a and 30b (e.g., force F in FIG. 3).

The preferred hydraulic fluid supply subsystem is operable to supply fluid to piston-cylinder assembly 30a during periods of high speed, low force operations (such as when thigh member 14, FIG. 2 lifts shin member 16 during a walking maneuver) and to supply fluid to both piston-cylinder assembly 30a, FIG. 3 and piston-cylinder assembly 30b during high force operations (such as when thigh member 14, FIG. 2 lowers shin member 16 until foot 17 engages the ground). Another example is when a given leg is supporting a greater proportion of the total load due to a specific maneuver or behavior.

In this particular example, the fluid supply subsystem includes pump 40 (driven, for example, by a fuel powered internal combustion engine) providing hydraulic fluid at pressure P (e.g., 3,000 psi) to pressure manifold 42 and then via conduit 44 to electronically activatable control valve/manifold combination 46 (e.g., a Moog servo valve). Control valve 46 regulates the flow and pressure of fluid from pump 40 to actuators 30a and 30b depending on the force required. Conduit 48 supplies hydraulic fluid to cylinder area 50a of piston-cylinder assembly 30a to drive piston 32a outward. Conduit 52 supplies hydraulic fluid to cylinder area 50b of piston-cylinder assembly 30a to drive piston 32a rearward.

Conduit 54 extends between control valve 46 and supply side valve 56 and conduit 58 supplies hydraulic fluid to cylinder area 60a of piston-cylinder assembly 30b to drive piston or rod 32b outward.

Control circuit 70 (e.g., a controller, processor, or other electronic circuit) is responsive to sensor 34 (and typically robot behavioral processor(s) 72) and is configured (e.g., programmed) to electronically operate control valve 46, supply side valve 56, and, optionally, pump 40. Note that control circuit 70 need not be a separate chip or component. Instead, the logic of control circuit 70 could be integrated with the control system of the robot.

In one example, when sensor 34 signals controller 70 that force F is below a predetermined magnitude, controller 70 electronically signals supply side valve 56 to close and hydraulic fluid at a given pressure is supplied and regulated via control valve 46 to cylinder area 50*a* of cylinder 36*a* of piston-cylinder assembly 30*a* only. One example is when thigh 14, FIG. 2 is maneuvering shin 16 during a walking behavior as dictated by robot processor(s) 72, FIG. 3 and that leg is experiencing a normal load factor. When supply side valve 56 closes, return side valve 80 connects actuator 30*b* to return allowing oil to move freely in and out of the cylinder effectively disconnecting it from the high pressure fluid source.

When load sensor 34 signals controller 70 that, for example, shin 16, FIG. 2 is experiencing a load above the predetermined magnitude, controller 70, FIG. 3 electronically opens supply side valve 56 and closes return side valve 80 and now high pressure hydraulic fluid controlled by valve 46 is supplied to cylinder area 60*a* of cylinder 36*b* of piston-cylinder assembly 30*b* via conduit 58 as well as to cylinder area 50*a* of piston-cylinder assembly 30*a* via conduit 48. This puts the total piston area under the precise control of valve 46. One example is when thigh member 14, FIG. 2 lowers shin member 16 as foot 17 engages the ground and that leg is experiencing a higher than normal load factor due to the position and angle of the other legs.

In this particular example, piston-cylinder assembly 30*a* operates bi-directionally under the force of hydraulic fluid and piston-cylinder 30*b* operates uni-directionally under the force of hydraulic fluid.

To retract leg 12, FIG. 2, controller 70, FIG. 3 under a command from robot processor(s) 72 electronically controls control valve 46 to supply hydraulic fluid at pressure P to cylinder area 50*b* of piston-cylinder assembly 30 via conduit 52. Controller 70 also closes supply side valve 56 and electronically opens return side valve 80 which allows hydraulic fluid to return via conduits 58 and 82 to return manifold 84 (at, for example, 150 psi). The return side for hydraulic piston-cylinder assembly 30*a* includes control valve 46 and conduit 86 between control valve 46 and return manifold 84. In general, controller 70 is typically programmed to open supply side valve 56 and close return side valve 80 when piston 32*b* of piston-cylinder assembly 30*b* is actuated, and to close supply valve 56 and open return side valve 80 when piston 32*b* is retracted via the retraction of piston 32*a* of piston-cylinder assembly 30*a*. But, in other examples, with additional valving the hydraulic system could be configured such that piston-cylinder assembly 30*b* is bi-directionally operational under hydraulic fluid pressure as well. The preferred system only requires one precision control valve and one or more simple on/off valves. Accurate control of Force F then depends on controller 70, sensor 34 and control valve 46.

The result is a very fast and precisely controlled "actuator on demand" where piston-cylinder assembly 30*b*, when actuated, enables high power operation, but when de-activated enables lower power operation.

Additional hydraulic pumps, a larger pump, and/or in general a larger hydraulic power plant is not typically required. In this way, the payload capacity of the robot increases since a larger power plant is not contributing to the weight of the robot.

In one example, during locomotion, foot 17, FIG. 2 is moved along the terrain from points A-B-C-D under the control of robot processor 72, FIG. 3. The portion of the foot path that is in the air is called flight which the portion when it's on the ground is called stance. At the end of stance at position, controller 70 lifts foot 17 off the ground by commanding the joints to move via the actuators. During flight, high velocity, low force is required. At the beginning of flight, controller 70 commands supply side valve 56 to close and return side valve 80 to open effectively deactivating actuator 30*b*. When foot 17, FIG. 2 reaches position B, it enters stance. During the early part of stance, controller 70, FIG. 3 commands the leg to carry the load of the body. Sensor 34 monitors the load on the actuators as load is transferred to leg 12, FIG. 2. When the force at sensor 34, FIG. 3 exceeds the capacity of primary actuator 30*a*, controller 70 commands return side valve 80 to close and supply side valve 56 to open switching additional piston-cylinder assemblies as needed to increase the effective area of the actuator.

Figure 4:
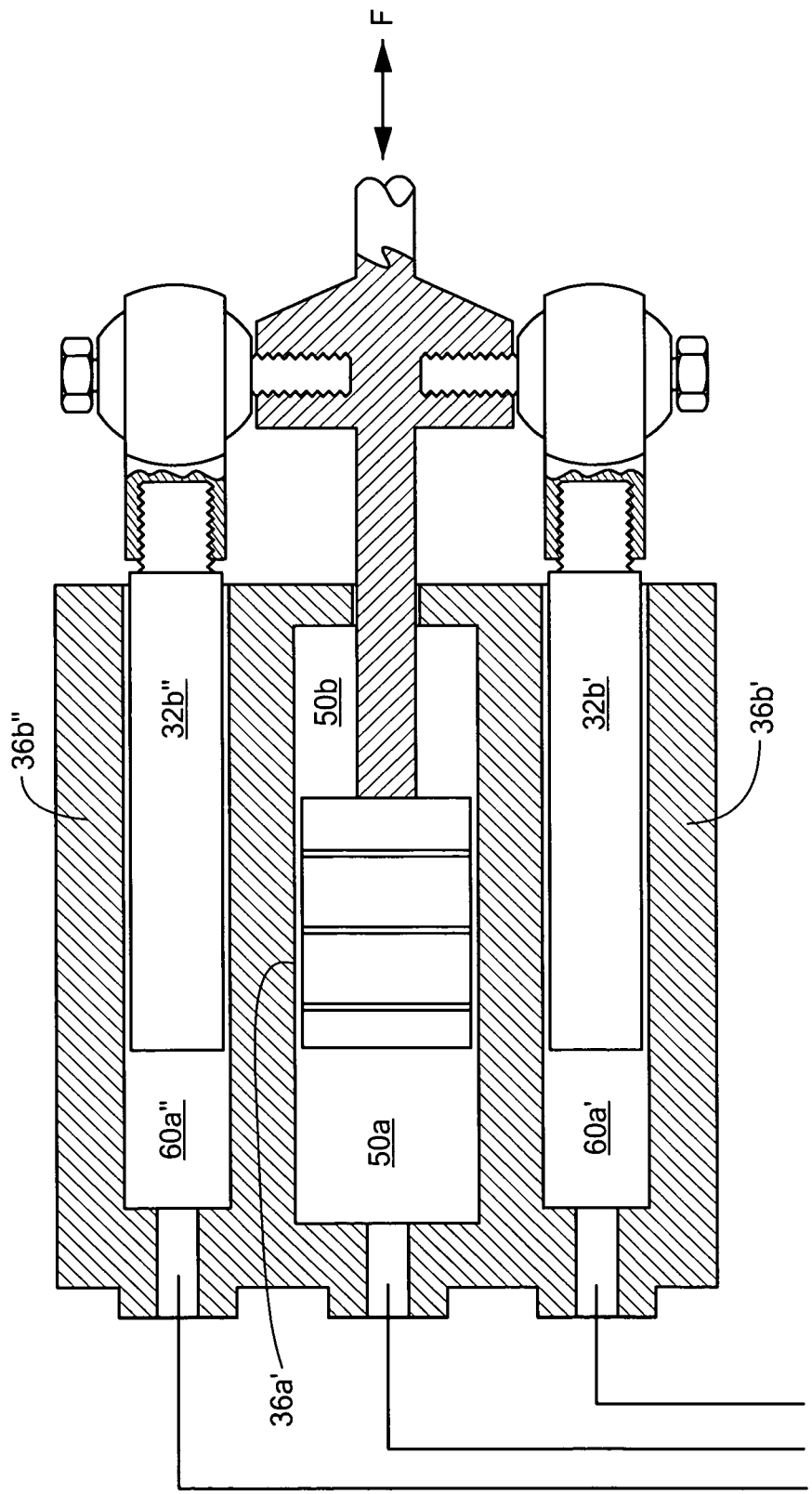
FIG. 4 is a highly schematic cross-sectional view showing an example of a new piston-cylinder assembly in accordance with the subject invention.

In FIG. 3 and in the description so far, piston-cylinder assemblies 30*a* and 30*b* are showed as separate units. FIG. 4 shows an integrated assembly in one example where piston 32*a'* is actuated in a manner similar to piston 32*a*, FIG. 3. The other piston area includes pistons or rods 32*b'* and 32*b'''*—one on each side of piston 32*a'* for balancing—both connected to piston 32*a'* as shown at 90. The controller supplies hydraulic fluid under pressure only to cylinder area 50*a* of cylinder 36*a'* when the load experienced by the system is less than a predetermined magnitude. When the force experienced by the system is above that predetermined magnitude, the controller would electronically control the fluid supply circuit to supply hydraulic fluid under pressure to cylinder area 50*a* of cylinder 36*a'*, to cylinder area 60*a'* of cylinder 36*b'*, and to cylinder area 60*a''* of cylinder 36*b''*. Again, bi-directional operation is possible for all three pistons. In still another example, a series of stacked rotary valve actuators could be used.

The result in any embodiment is a new actuator system for a robotic or bionic linkage which enables high power on demand while enabling low power operation when needed. The hydraulic circuit switches in an additional piston-cylinder assembly as needed to increase the effective area of the actuator.

Note, however, that all of the examples above describe an embodiment of the subject invention in conjunction with one leg of a legged robot. It is to be understood that other leg joints, shoulder joints, and the like of a legged robot or arm joints of a manipulator or other actuated mechanical systems could employ the technology described herein. And, the inventive concepts herein apply to powered exoskeletons, prosthesis arms and legs, and other robotic and bionic applications.

Figure 5:
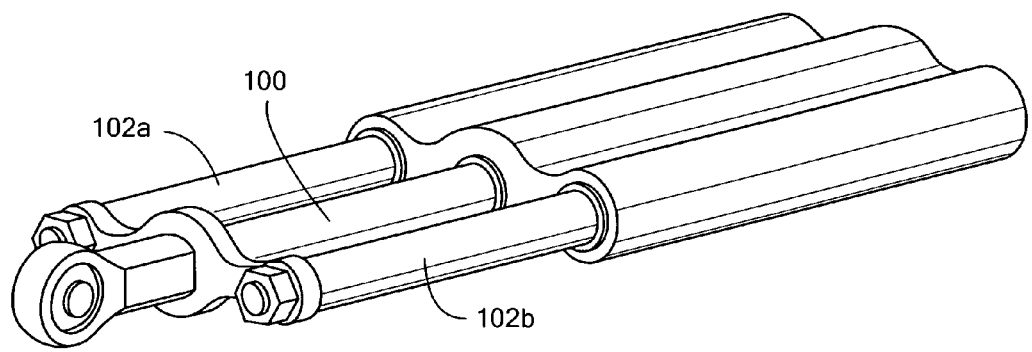
FIGS. 5-7 are schematic three-dimensional views showing additional actuator assembly designs in accordance with the subject invention.
Figure 6:
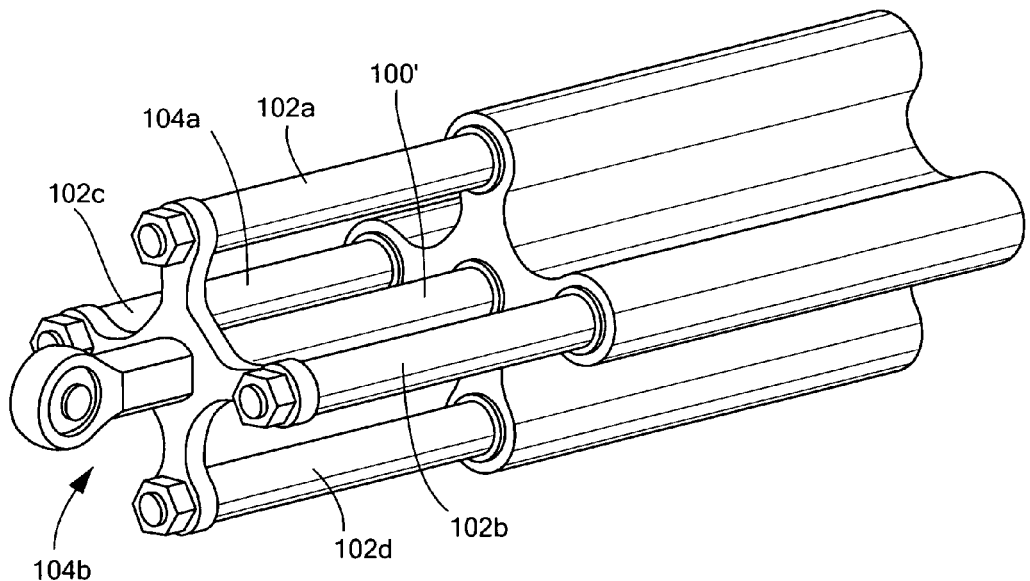
Figure 7:
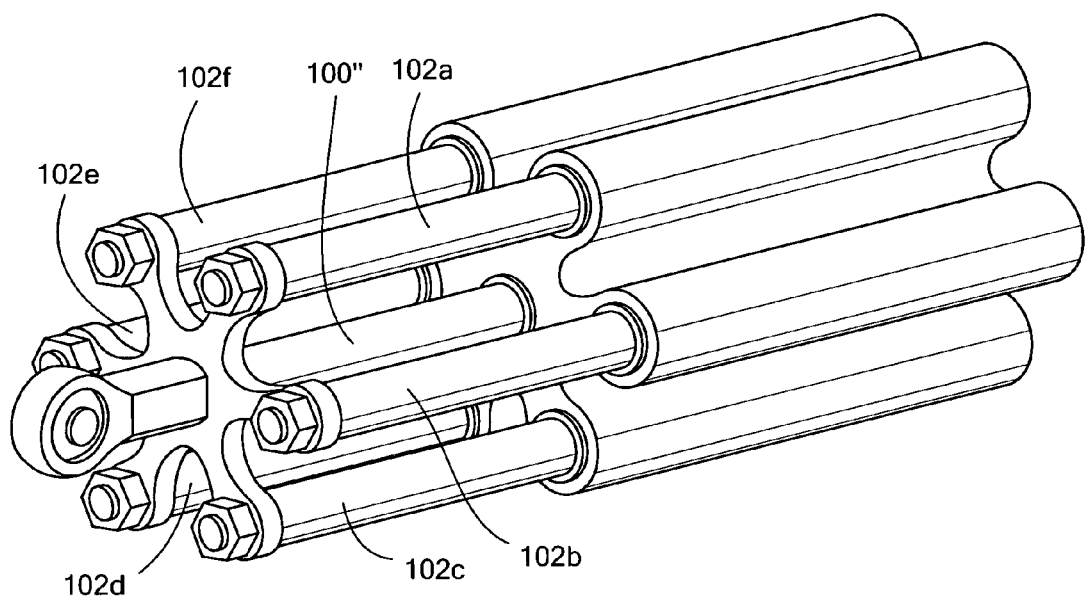

FIGS. 5-7 show additional actuator configurations. In FIG. 5, piston-cylinder assembly 100 is a type I actuator (small bore, double acting) and piston-cylinder assemblies 102*a* and 102*b* constitute type II actuators (large bore, single acting). In FIG. 6, there is one type I actuator 100' and two type II actuators 104*a* and 104*b* including piston-cylinder assemblies 102*a* and 102*b*, and 102*c* and 102*d*, respectively. FIG. 7 shows one type I actuator (piston-cylinder assembly 100'') and three type II actuators (1) piston-cylinder assemblies 102*a* and 102*b*, (2) piston-cylinder assemblies 102*c* and 102*d*, and (3) piston-cylinder assemblies 102*e* and 102*f*.

Typically, only the type I actuator is used when the load is low and then, when the load is high, the type II actuators are also used. All or a subset of the type II actuators can be used depending on the load experienced by the system.

Thus, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An actuator system for a linkage comprising:
   a joint between two members;
   at least first and second actuator assemblies connected between the members; and
   a hydraulic circuit including:
      a sensor subsystem for sensing a magnitude of a load on the actuator assemblies and/or members;
      a fluid supply system including an actuatable control valve operable to supply fluid to one or both actuator assemblies, and
      a control circuit responsive to the sensor and configured to electronically control the fluid subsystem to supply fluid to the first actuator assembly when the sensor subsystem senses a load below a predetermined magnitude and to supply fluid to both actuator assemblies when the sensor subsystem senses a load above the predetermined magnitude.

2. The system of claim 1 in which both actuator assemblies are piston-cylinder assemblies.

3. The system of claim 2 in which the fluid supply system includes:
   a pump providing hydraulic fluid to the actuatable control valve;
   a conduit between the first piston-cylinder assembly and the control valve for providing fluid to the first piston-cylinder assembly to drive the piston in one direction; and
   a conduit between the control valve and the second piston-cylinder assembly with a supply side valve actuatable to selectively supply fluid to the second piston-cylinder assembly.

4. The system of claim 3 in which the control circuit is configured to electronically control the control valve and the supply side valve opening both when the sensor subsystem senses a load above the predetermined magnitude and closing the supply side valve when the sensor subsystem senses a load below the predetermined magnitude.

5. The system of claim 3 in which at least the first piston-cylinder assembly is bi-directionally operable and the fluid supply subsystem includes a second conduit between the control valve and the first piston cylinder assembly for driving the piston in the opposite direction.

6. The system of claim 3 in which the fluid supply subsystem further includes a return side valve actuatable to connect the second piston-cylinder assembly to return.

7. The system of claim 6 in which the control circuit is configured to electronically open the return side valve when the supply side valve is closed and to close the return side valve when the supply side valve is open.

8. The system of claim 2 in which the first and second piston-cylinder assemblies are separate components.

9. The system of claim 2 in which the first and second piston-cylinder assemblies are integrated.

10. The system of claim 9 in which the integrated assembly includes a first piston of the first piston-cylinder assembly connected to a first piston of the second piston-cylinder assembly.

11. The system of claim 10 in which the second piston-cylinder assembly includes a second piston connected to the first piston of the first piston-cylinder assembly and to the first piston of the second piston-cylinder assembly to balance the first piston of the second piston-cylinder assembly.

12. A legged robot comprising:
    a robot body;
    at least one leg including two or more actuatable jointed members;
    select jointed members including at least first and second actuator assemblies connected therebetween;
    a sensor subsystem for sensing a magnitude of a load applied to a robot member;
    a fluid supply subsystem operable to supply fluid to one or both actuator assemblies; and
    a control circuit responsive to the sensor subsystem and configured to electronically control the fluid supply subsystem to supply fluid to the first actuator assembly when the sensor subsystem senses a load below a predetermined magnitude and to supply fluid to both actuator assemblies when the sensor subsystem senses a load above the predetermined magnitude.

13. The robot of claim 12 in which the first and second actuator assemblies are piston-cylinder assemblies.

14. The robot of claim 13 in which the fluid supply system includes:
    a pump providing hydraulic fluid to an electronically actuatable control valve;
    a conduit between the first piston-cylinder assembly and the control valve for providing fluid to the first piston-cylinder assembly to drive the piston in one direction; and
    a conduit between the control valve and the second piston-cylinder assembly with a supply side valve actuatable to selectively supply fluid to the second piston-cylinder assembly.

15. The robot of claim 14 in which the control circuit is configured to electronically control the control valve and the supply side valve opening both when the sensor subsystem senses a load above the predetermined magnitude and closing the supply side valve when the load sensor subsystem senses a load below the predetermined magnitude.

16. The robot of claim 14 in which at least the first piston-cylinder assembly is bi-directionally operable and the fluid supply subsystem includes a second conduit between the control valve and the first piston cylinder assembly for driving the piston in the opposite direction.

17. The robot of claim 14 in which the fluid supply subsystem further includes a return side valve actuatable to allow fluid from the second piston-cylinder assembly to return to the pump.

18. The robot of claim 17 in which the control circuit is configured to electronically open the return side valve when the supply side valve is closed and to close the return side valve when the supply side valve is open.

19. The robot of claim 13 in which the first and second piston-cylinder assemblies are separate components.

20. The robot of claim 13 in which the first and second piston-cylinder assemblies are integrated.

21. The robot of claim 20 in which the integrated assembly includes a first piston of the first piston-cylinder assembly connected to a first piston of the second piston-cylinder assembly.

22. The robot of claim 21 in which the second piston-cylinder assembly includes a second piston connected to the first piston of the first piston-cylinder assembly and to the first piston of the second piston-cylinder assembly to balance the first piston of the second piston-cylinder assembly.

* * * * *

UNITED STATES PATENT AND TRADEMARK OFFICE
CERTIFICATE OF CORRECTION

PATENT NO. : 8,126,592 B2  Page 1 of 1
APPLICATION NO. : 12/287751
DATED : February 28, 2012
INVENTOR(S) : Aaron Saunders et al.

It is certified that error appears in the above-identified patent and that said Letters Patent is hereby corrected as shown below:

In the specification

Column 1, line 3, insert the following:

--STATEMENT OF GOVERNMENT RIGHTS

This invention was made with Government support under contract no. N66001-07-C-2029 awarded by the U.S. Defense Advanced Research Projects Agency. The Government has certain rights in the invention.--

Signed and Sealed this
Fourth Day of August, 2015

Michelle K. Lee
*Director of the United States Patent and Trademark Office*